United States Patent

[11] 3,573,821

[72] Inventor Neil C. Kern
 Scottsdale, Ariz.
[21] Appl. No. 790,327
[22] Filed Jan. 10, 1969
[45] Patented Apr. 6, 1971
[73] Assignee Motorola Inc.
 Franklin Park, Ill.

[54] DIFFERENTIAL RANGING SYSTEMS
 2 Claims, 2 Drawing Figs.
[52] U.S. Cl. .................................... 343/7.3,
 343/7.5
[51] Int. Cl. .................................... G01s 9/14
[50] Field of Search .......................... 343/7, 3,
 7.5

[56] References Cited
UNITED STATES PATENTS
2,703,399 3/1955 Williams et al. .............. 343/7.3
2,745,095 5/1956 Stoddard ..................... 343/7.3

Primary Examiner—Richard A. Farley
Assistant Examiner—T. H. Tubbesing
Attorney—Mueller, Aichele and Rauner ABSTRACT: A radar transmitter and receiver showing a single antenna system of the monopulse type tracks a small target having a relative motion with respect to a large target, both located on a common boresight. A differential ranging circuit measures the difference between the tracked small target and the tracked large target. Upon the differential range reaching a predetermined threshold, a command signal is generated and transmitted to the small target causing it to perform a function.

Patented April 6, 1971

3,573,821

INVENTOR.
NEIL C. KERN
BY
Mueller, Aichele & Rauner
ATTORNEYS

DIFFERENTIAL RANGING SYSTEMS

BACKGROUND OF THE INVENTION

This invention relates to radar tracking and command systems and more particularly to such systems which utilize coherent radiation.

In many radar applications, it is desired to determine the range between two different objects or radar targets. Such measurements are termed "differential ranging techniques". In measuring such differential range, it is desired that errors due to alignment and astigmatism be eliminated.

Applications of differential ranging systems include detection when an airborne target approaches a larger object, such as earth or a mother ship, and it is desired to reduce the velocity of the small airborne object. Other functions can be performed, such as changing direction of flight or performing some internal function.

If a sufficiently small target has a predetermined relationship between the radar system and a larger target, then both targets can be kept on the same boresight of a radar system utilizing angle tracking techiniques.

SUMMARY OF THE INVENTION

It is an object of this invention to provide differential ranging with a single radar system and to provide for command functions to be supplied.

A feature of the invention is the maintenance of a small target in the boresight of a monopulse radar system with the boresight intersecting a larger radar target.

Another feature is the differential ranging of the two targets maintained in the same boresight with the emission of a command when the differential range reaches a predetermined threshold.

Apparatus employing the present invention includes a single antenna system with a coherent transmitter-receiver. A large target range tracker and a small target range tracker respectively track two different targets. The small target range tracker supplies reset signals to a differential ranging circuit for initiating a differential ranging operation. The large target range tracker stops the differential ranging operation and samples whether or not a particular range threshold has been reached. Upon the reaching of such a predetermined range threshold, a command signal is supplied to the coherent transmitter and receiver for transmission of such command signal to one of the radar targets. An angle tracker is utilized to direct the antenna to keep the two targets in the boresight of the antenna.

THE DRAWING

DETAILED DESCRIPTION OF THE ILLUSTRATIVE EMBODIMENT

Figure 1:
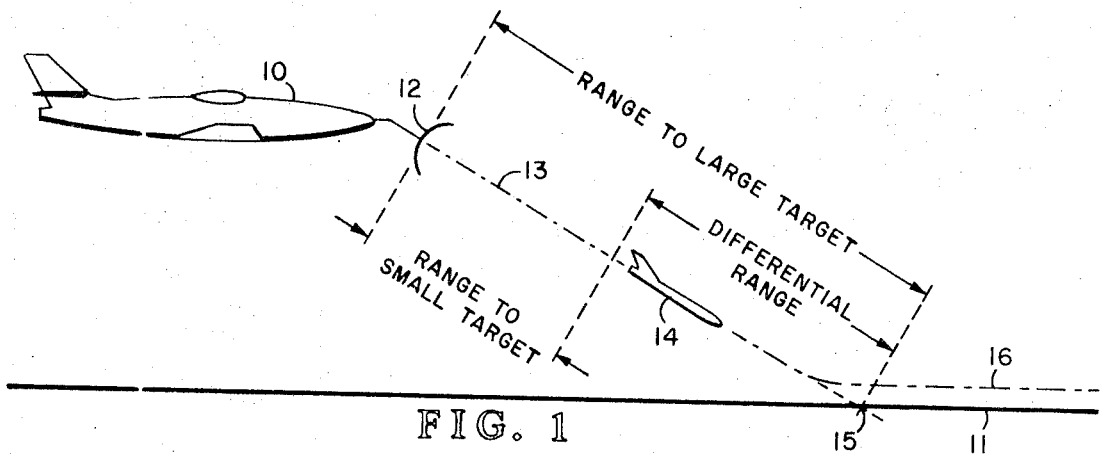
FIG. 1 is a diagrammatic showing of an application of the invention wherein the radar system is in an aircraft and a boresight is directed toward the earth with an airborne target therebetween.

Referring to FIG. 1, an aircraft 10 airborne above the earth surface 11 has a nose radar system with an angle directable antenna 12. The later described radar system is of the monopulse type having a boresight 13 which intersects small airborne target 14 and the large target consisting of the earth surface 11. The point of intercept 15 is range tracked by the radar system. The range to the large target is continually measured as well as the range to the small target. Differential ranging means inside the radar system later described maintain a constant check on the actual differential range between target 14 and intercept point 15 on large target 11. In the particular illustrated embodiment, when small target 14 reaches a predetermined distances from intercept point 15, a radar system in aircraft 10 emits a command signal to small target 14 causing it to perform a function. In one instance, the function performed could be to change direction of flight of target 14 such that it would then fly parallel to the earth surface 11 as indicated by dotted line 16. In another application, the velocity of small target 14 could be greatly reduced such that the landing on earth surface 11 was made to lie within predetermined landing specifications of the small target. For example, a parachute could be ejected from the small target for causing a soft landing. The other functions can be performed by the small target as is well known in the art. Such functions may be internal or may effect the flight pattern or perform some other signalling or physical operation. Also, the large target could be a mother ship and the command signal could be sent to the mother ship to perform a function. In the latter illustration, the aircraft 10 could be an exploring vehicle and small target 14 a capsule being sent to a mother ship.

Figure 2:
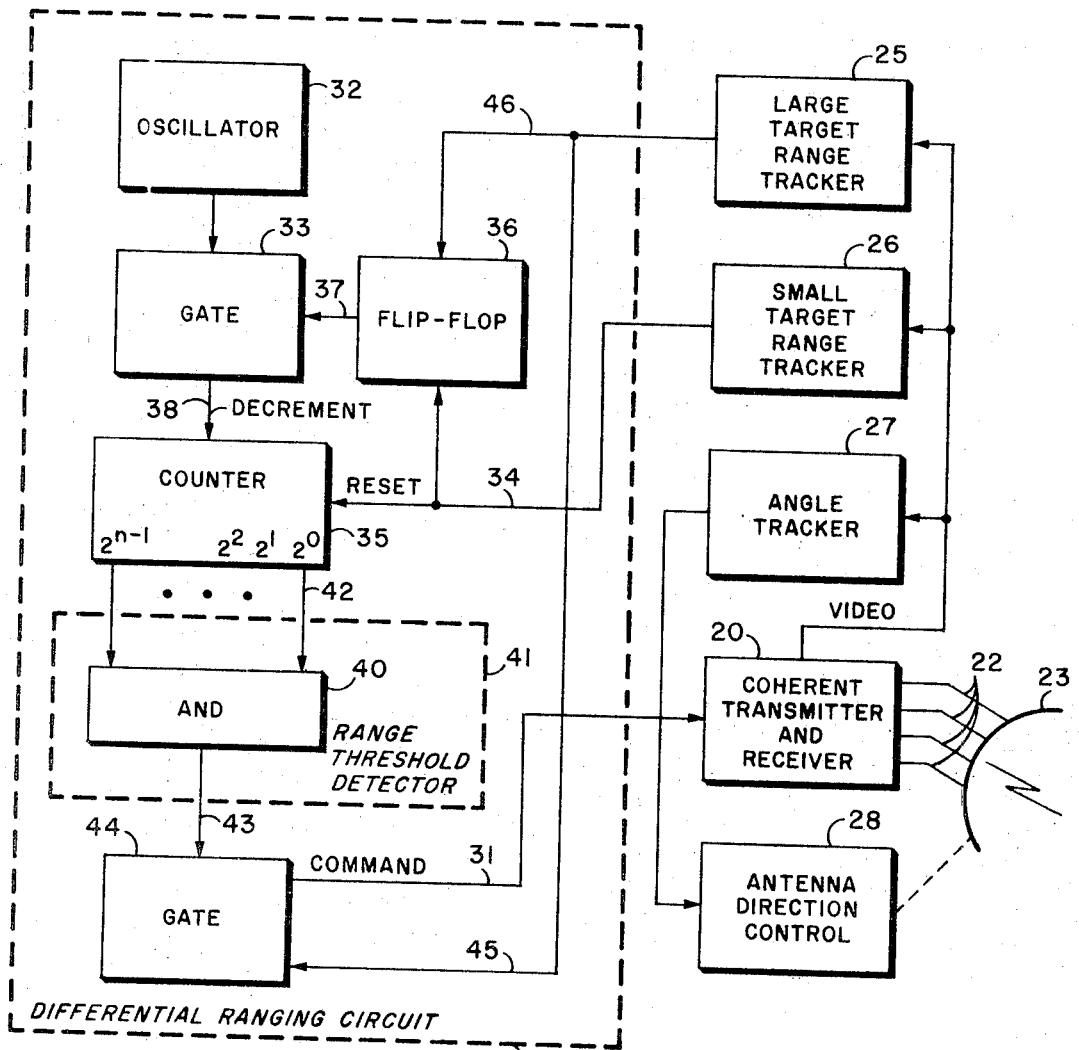
FIG. 2 is a simplified block signal flow diagram for a radar system illustrating the present invention.

Referring next to FIG. 2, there is shown a coherent transmitter and receiver 20 having four feed lines 22 to radar antenna system 23. Items 20, 22 and 23 may be of the type of radar systems described by Merrill Skolnik in "Introduction to Radar Systems", pages 175 et seq., McGraw Hill 1962, Library of Congress No. 61-17675. The coherent transmitter-receiver system generates a boresight in the radar beam represented by dotted line 13 of FIG. 1. The video signal from coherent transmitter-receiver 20 is supplied to large target range tracker 25, small target range tracker 26, and to angle tracker 27. The two range trackers and the angle tracker can be of known design and construction. The large target range tracker is designed to track the distance between the aircraft 10 and the intercept point 15 of large target surface 11 along boresight 13. Small target range tracker 26 latches onto and tracks the range of small target 14. Angle tracker 27 is utilized through the antenna direction control 28 to angle track the small target 14 in a known manner. Since the earth surface 11 is quite large with respect to the small target 14, many relative positionings with respect to aircraft 10 and small target 14 can maintain the two targets within boresight 13. Of course, aircraft 10 can be maneuvered to assist in such operation.

Large target range tracker 25 measures slant range along boresight using slant ranging techniques and small target range tracker 26 measures range in a conventional manner. Both supply signals indicating range in the time domain to differential ranging circuit 30. Since both the range trackers 25 and 26 are operated based upon the emission of the same energy, the time differential between the receipt of the small target return and the large target slant range is an indication of differential range. Differential ranging circuit 30 measures this time difference and translates same into range by use of counting techniques and compares same with a range threshold to determine whether or not a command signal should be supplied over line 31 to coherent transmitter and receiver for transmission to small target 14.

Differential ranging circuit 30 includes oscillator 32 which operates at a frequency and supplies pulses in accordance with the quantizing of range by the coherent transmitter and receiver 20 as is well known in the art. In fact, oscillator 32 may actually reside in the coherent transmitter-receiver or any one of the range trackers that is used to supply pulses for quantizing range. For convenience, it is shown as being a part of differential ranging circuit 30. The range quantizing pulses are continuously supplied to gate 33. Upon the detection of the range by small target range tracker 26 for each repeated emission of energy, i.e., main timing pulse of transmitter and receiver 20, a pulse signal of short duration is supplied over line 34 to reset differential range counter 35 to a reference state (all 1's, for example) and to flip-flop 36 to its active condition. Differential ranging circuit 30 is now ready to measure differential range.

Flip-flop 36, when set to the active condition, supplies a gate enabling signal over line 37 for enabling gate 33 to pass range quantizing pulses over line 38 to counter 35. As pulses are received over line 38, the counter subtracts the number of quantizing pulses from the all 1's condition making the counter count toward an all 0's condition. The difference between the count in the counter and the all 1's condition is indicative of the differential range. Of course, any counting system may be used.

Upon detection of range of large target 11, the differential ranging operation is stopped by resetting flip-flop 36 to stop the pulses from oscillator 32 from reaching counter 35. The large target range indicating pulse on line 45 is supplied over line 46 to reset flip-flop 36, thereby disabling gate 33 and preventing more pulses from being supplied to counter 35. In this manner counter 35, after the emission of the large target range indicating pulse, contains an indication of the differential range. This indication may be maintained therein until the small target is again range indicated by small target range tracker 26 subsequent to the next successive emission of interrogation energy through antenna 23. This range indicating pulse resets counter 35 again to all 1's condition reinitiating differential range measurement. The differential count indication in counter 35 may be supplied to an indicator (not shown).

To determine whether or not the differential range is sufficiently short such as to require a generation of a command signal, AND circuit 40 is provided as a range threshold detector 41. AND circuit 40 receives a plurality of input signals from the counter stages of counter 35. The particular connections between the different stages $2^{n11}$ through $2^0$ of the counter 35 and AND circuit 40 determine the differential range required to generate an enabling signal on line 43. In the case wherein the differential range level is less than seven quantized range units represented by the output pulses of oscillator 32, the stages of the counter must count down from the all ones reset state to the point where all stages but the $2^1$ and $2^2$ stages are in the zero state. Thus, the zero side of each of the stages with the exception of the $2^1$ and $2^2$ stages are coupled to AND circuit 40 and upon a coincidence of inputs to circuit 40 a gate enabling signal is supplied over line 43 to gate 44. Gate 44 receives a second input over line 45 from the large target range detector 25 indicating the range of the large target. If gate 44 is enabled, the range indicating pulse on line 45 is supplied over line 31 to coherent transmitter-receiver 20 for generation of a command signal to small target 14 for performing a function.

It may be desired that the modulus of counter 35 be not as great as the maximum range to be measured. In accordance therewith, the pulse on line 34 may be inhibited until the small target range has exceeded a predetermined threshold.

I claim:

1. Differential ranging control including the combination of a coherent transmitter and receiver having a monopulse-type directive antenna having a boresight in a radar beam:
   large target range tracker means receiving a signal from said coherent transmitter and receiver for range tracking a large target and supplying a signal indicative of this range;
   small target range tracker means receiving said signal from said coherent transmitter and receiver for range tracking a small target and supplying a signal indicative of range;
   means for angle directing the antenna such as to angle track said small target;
   differential ranging means responsive to said range indicating signal of said small target range tracker to initiate a differential ranging operation and further responsive to said range indicating signal from said large target range tracker to stop said differential ranging operation, said differential means including a counter responsive to the signal from the small target means to assume a reference state, said differential means also including control means responsive to the signal from said small target means to provide range quantizing signals to said counter, said control means being further responsive to the signal from said large target means to terminate the passage of range quantizing signals to said counter, said counter counting the range quantizing signals; and
   threshold means in said differential ranging means responsive to said counter indicating a predetermined range, said threshold means providing a command pulse with said coherent transmitter and receiver means being responsive thereto.

2. The subject matter of claim 1 wherein said threshold means includes gating means enabled to pass a signal whenever said predetermined range is indicated, and said large target tracker means being connected to said gating means for supplying said large target indicating signal to said gating means for being passed as said command pulse.